(12) United States Patent
Ohkuma et al.

(10) Patent No.: US 6,334,004 B1
(45) Date of Patent: Dec. 25, 2001

(54) OPTICAL MODULATOR, BIAS CONTROL CIRCUIT THEREFOR, AND OPTICAL TRANSMITTER INCLUDING THE OPTICAL MODULATOR

(75) Inventors: Yoshinori Ohkuma; Motoyoshi Sekiya, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/460,390

(22) Filed: Dec. 13, 1999

(30) Foreign Application Priority Data

Dec. 18, 1998 (JP) .................................. 10-361231

(51) Int. Cl.⁷ ....................................... G02F 1/035
(52) U.S. Cl. .................. 385/2; 385/8; 385/9; 385/16; 385/39; 385/40; 359/237
(58) Field of Search ................... 385/2, 3, 8, 9, 385/15, 16, 39, 40; 359/237, 259

(56) References Cited

U.S. PATENT DOCUMENTS

| | | | |
|---|---|---|---|
| 5,453,608 | * | 9/1995 | Conder ........................... 385/2 |
| 5,680,246 | * | 10/1997 | Takahashi et al. .............. 359/341 |
| 6,185,345 | * | 2/2001 | Singh et al. .................... 385/24 |
| 6,201,632 | * | 3/2001 | Rollins ........................... 359/259 |
| 6,239,897 | * | 5/2001 | Jackson .......................... 385/2 |

FOREIGN PATENT DOCUMENTS

| | | |
|---|---|---|
| 1-237516 | 9/1989 | (JP) . |
| 3-145623 | 6/1991 | (JP) . |
| 4-24610 | 1/1992 | (JP) . |
| 05173101 | 7/1993 | (JP) . |
| 09243972 | 9/1997 | (JP) . |

* cited by examiner

Primary Examiner—Darren Schuberg
Assistant Examiner—Fayez Assaf
(74) Attorney, Agent, or Firm—Staas & Halsey, LLP

(57) ABSTRACT

Disclosed herein is an optical modulator including an optical waveguide structure for converting an input beam into first and second output beams, an electrode for applying an electric field to the optical waveguide structure, so as to switch between a first mode where the input beam is converted into the first output beam and a second mode where the input beam is converted into the second output beam, first and second photodetectors for detecting the powers of the first and second output beams, respectively, and a bias circuit for applying a bias to the electrode so that the ratio in output level between the first and second photodetectors becomes constant. With this configuration, an operation point can be stabilized without the need for superimposition of a low-frequency signal, thereby suppressing intersymbol interference.

16 Claims, 11 Drawing Sheets

RED SHIFT
$\alpha > 0$

BLUE SHIFT
$\alpha < 0$

OPTICAL MODULATOR, BIAS CONTROL CIRCUIT THEREFOR, AND OPTICAL TRANSMITTER INCLUDING THE OPTICAL MODULATOR

BACKGROUND OF THE INVENTION

1. Field of the Invention

The present invention relates to an optical modulator, a bias control circuit therefor, and an optical transmitter including the optical modulator.

2. Description of the Related Art

In an optical fiber communication system, a modulation rate is increasing with an increase in capacity of the system. In direct intensity modulation of a laser diode, wavelength chirping is a problem. The chirping causes waveform distortion when an optical signal passes an optical fiber having chromatic dispersion. From a standpoint of fiber loss, the most desirable wavelength to be applied to a silica fiber is 1.55 μm. At this wavelength, a normal fiber has a chromatic dispersion of about 18 ps/km/nm, which limits a transmission distance. To avoid this problem, an external modulator has increasingly been expected.

As a practical external modulator, a Mach-Zehnder type optical modulator (LN modulator) using $LiNbO_3$ (lithium niobate) as a substrate has been developed. Continuous-wave light (CW light) having a constant intensity from a light source is supplied to the LN modulator, in which a switching operation using interference of light is carried out to obtain an intensity-modulated optical signal.

The LN modulator has a frequently pointed-out defect that it causes operation point drift. To cope with the operation point drift, light output from the LN modulator is monitored, and control for operation point stabilization is carried out according to an electrical signal obtained as the result of this monitoring.

FIG. 1 is a plan view of a conventional modulator chip in an LN modulator. This modulator chip has an optical waveguide structure 4 provided by a dielectric chip 2. The dielectric chip 2 is formed of lithium niobate. In this case, the optical waveguide structure 4 is obtained by thermal diffusion of Ti (titanium).

The optical waveguide structure 4 has an input port 6 for receiving an input beam from a light source (not shown) and an output port 8 for outputting a modulated optical signal. The optical waveguide structure 4 further has a first Y branch 10 and a second Y branch 12 respectively connected to the input port 6 and the output port 8, and first and second paths 14 and 16 for connecting the Y branches 10 and 12.

The input beam supplied to the input port 6 is branched into first and second beams substantially equal in optical power to each other by the first Y branch 10. The first and second beams are guided by the paths 14 and 16, respectively, and then interfere with each other at the second Y branch 12. According to a phase difference between the first and second beams at the second Y branch 12, switching is carried out between a coupling mode where an output beam is obtained at the output port 8 and a leaky mode where a leaky beam is radiated from the second Y branch 12 into the dielectric chip 2, thereby outputting an intensity-modulated optical signal from the output port 8.

To change the phase difference between the first and second beams, a grounding electrode 18 is provided on the first path 14, and a signal electrode 20 is provided on the second path 16. The signal electrode 20 is configured as a traveling wave type such that an input end 20A is connected to an internal conductor of a connector 22 and an output end 20B is connected to an internal conductor of a connector 24. Shields of the connectors 22 and 24 and the grounding electrode 18 are grounded. The electrodes 18 and 20 are formed by vapor deposition of Au (gold), for example. Although not shown, a single or plural stabilizing buffer layers formed of Si and/or $SiO_2$ may be provided between the dielectric chip 2 and the electrodes 18 and 20.

Operation point drift will now be described with reference to FIG. 2. In an LN modulator, an operation characteristic curve is drifted by a temperature change or aged deterioration in general (which is referred to as operation point drift). In FIG. 2, reference numerals 26 and 28 denote an operation characteristic curve and an output optical signal waveform, respectively, in the case that no operation point drift occurs, and reference numerals 30 and 32 denote an operation characteristic curve and an output optical signal waveform, respectively, in the case that an operation point drift toward positive voltage occurs. Reference numeral 34 denotes a waveform of an input signal or modulating signal (drive voltage).

The operation characteristic curve is represented as a periodic change in output optical power with an increase in voltage. In the example shown, the periodic change is given by a sine curve. Accordingly, by using voltages V0 and V1 respectively providing a minimum value and a maximum value of the optical power, respectively corresponding to the two logical values (the high level and low level) of the input signal as a binary signal to thereby perform effective switching between the coupling mode and the leaky mode mentioned above, efficient binary modulation can be performed.

When the voltages V0 and V1 are constant upon occurrence of the operation point drift, the extinction ratio of the output optical signal is degraded as shown by reference numeral 32 by the periodicity of the operation characteristic curve. Accordingly, when the operation point drift occurs in an amount of dV, the voltages V0 and V1 must be changed to (V0+dV) and (V1+dV), respectively, thereby compensating for the operation point drift.

FIG. 3 is a block diagram of a conventional optical transmitter (optical modulator) designed so as to effect operation point stabilization. CW light as an input beam from a laser diode (LD) 36 is supplied to the input port 6 of the modulator chip 2 shown in FIG. 2, for example. An output beam from the output port 8 of the modulator chip 2 is divided into two branch beams by an optical coupler 38. One of the two branch beams is launched into an optical fiber transmission line (not shown), and the other branch beam is supplied to a photodetector (PD) 40. The photodetector 40 is provided by a photodiode, for example. In this case, the photodetector 40 outputs a current signal. Therefore, this current signal from the photodetector 40 is converted into a voltage signal by a current/voltage (I/V) converter 42. Thereafter, the voltage signal output from the I/V converter 42 is supplied through a bandpass filter 44 to a phase comparator circuit 46.

A low-frequency signal (pilot signal) output from an oscillator 48 is used for operation point stabilization. The pilot signal is supplied to the phase comparator circuit 46 and a drive circuit 50. The drive circuit 50 may be composed of a variable-gain amplifier for amplifying a data input signal and a low-pass filter connected to the output of the variable-gain amplifier. In this case, the gain of the variable-gain amplifier is changed by the low-frequency signal, and as a result, the low-frequency signal is superimposed on the data input signal. By the use of the low-pass filter, the low-frequency signal is superimposed on both the low level and high level of the data input signal in opposite phases. A resultant signal is then supplied as a modulating signal to the connector 22 of the modulator chip 2.

The phase comparator circuit 46 is provided by a synchronous detector circuit, for example. The phase comparator circuit 46 performs phase comparison between the low-frequency signal from the oscillator 48 and a low-frequency component from the photodetector 40. The result of this phase comparison appears in a DC component of an output signal from the phase comparator circuit 46. Then, the bias circuit 52 performs feedback control of a bias voltage to be supplied to the connector 24 of the modulator chip 2, according to the DC component. In this feedback loop, the bias voltage is adjusted so that the low-frequency component from the photodetector 40 is minimized.

Referring to FIG. 4, there is shown the principle of the operation point stabilization in the optical modulator shown in FIG. 3. Reference numeral 54 denotes a waveform of the input electrical signal, that is, a waveform of the modulating signal output from the drive circuit 50. An optimum operation point is determined by an operation characteristic curve such that both levels of the input electrical signal 54 provide maximum and minimum output optical powers as shown by reference numeral 56. When the characteristic curve is shifted as shown by reference numeral 58 or 60 along the voltage axis because of variations in temperature or the like, a low-frequency component is generated in the output optical signal, and the direction of shifting is reflected by the phase of the low-frequency component. That is, the phases of envelopes of the output optical signals provided by the characteristic curves 58 and 60 are different 180° from each other. Accordingly, the operation point is stabilized by performing synchronous detection with the phase comparator circuit 46 as shown in FIG. 3.

According to the conventional bias control technique for operation point stabilization as described above with reference to FIGS. 3 and 4, the low-frequency signal must be superimposed on the data input signal. Accordingly, there is a possibility of intersymbol interference on a main signal. Furthermore, the two levels of the input electrical signal must be made correspond to the minimum value and the maximum value of the optical output power. Accordingly, the amplitude of the input electrical signal is so limited as to correspond to a voltage (Vπ voltage) given by the difference between a voltage giving the maximum optical power and a voltage giving the minimum optical power in the operation characteristic curve. That is, in the case that the amplitude of the input electrical signal is smaller than the Vπ voltage, the extinction ratio of the output optical signal is degraded. Because a small value of the amplitude of the input electrical signal is suitable for achievement of a high modulation rate, the problem of degradation in the extinction ratio is serious in providing an optical modulator suitable for high-speed operation.

SUMMARY OF THE INVENTION

It is therefore an object of the present invention to provide an optical modulator which can suppress intersymbol interference, a bias control circuit for the optical modulator, and an optical transmitter including the optical modulator.

It is another object of the present invention to provide an optical modulator which can obtain a good extinction ratio irrespective of the amplitude of an input electrical signal, a bias control circuit for the optical modulator, and an optical transmitter including the optical modulator.

In accordance with an aspect of the present invention, there is provided an optical modulator comprising an optical waveguide structure, an electrode, first and second photodetectors, and a bias circuit. The optical waveguide structure converts an input beam into first and second output beams. The electrode applies an electric field to the optical waveguide structure, so as to switch between a first mode where the input beam is converted into the first output beam and a second mode where the input beam is converted into the second output beam. The first and second photodetectors detect the powers (or the average powers) of the first and second output beams, respectively. The bias circuit applies a bias to the electrode so that the ratio in output level between the first and second photodetectors becomes constant.

With this configuration, an operation point can be stabilized without superimposing a low-frequency signal on an input electrical signal (the operation principles will be hereinafter described), thereby suppressing intersymbol interference.

In a preferred embodiment of the present invention, the optical waveguide structure comprises an input port for receiving the input beam, first and second output ports for outputting the first and second output beams, respectively, a Y branch optically connected to the input port, an X branch optically connected to the first and second output ports, and first and second paths for optically connecting the Y branch and the X branch.

In another preferred embodiment of the present invention, the optical waveguide structure comprises an input port for receiving the input beam, an output port for outputting the first output beam, a first Y branch optically connected to the input port, a second Y branch optically connected to the output port, and first and second paths for optically connecting the first and second Y branches. In this case, the second output beam is provided by a leaky beam radiated from the second Y branch.

Preferably, the detection sensitivity of at least one of the first and second photodetectors is adjustable. With this configuration, the amplitude of an input electrical signal is not limited by the Vπ voltage mentioned above, so that a good extinction ratio can be obtained irrespective of the amplitude of the input electrical signal.

In accordance with another aspect of the present invention, there is provided a bias control circuit for an optical modulator. The optical modulator switches between a first mode where an input beam is converted into a first output beam as corresponding to one of the low level and high level of a modulating signal and a second mode where the input beam is converted into the second output beam as corresponding to the other of the low level and high level of the modulating signal. The bias control circuit comprises first and second photodetectors for detecting the powers (or the average powers) of the first and second output beams, respectively, and a bias circuit for applying a bias to the optical modulator so that the ratio in output level between the first and second photodetectors becomes constant.

In accordance with a further aspect of the present invention, there is provided an optical transmitter comprising a light source for providing an input beam; an optical waveguide structure for converting the input beam into first and second output beams; an electrode for applying an electric field to the optical waveguide structure, so as to switch between a first mode where the input beam is converted into the first output beam and a second mode where the input beam is converted into the second output beam; first and second photodetectors for detecting the powers (or the average powers) of the first and second output beams, respectively; and a bias circuit for applying a bias to the electrode so that the ratio in output level between the first and second photodetectors becomes constant.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
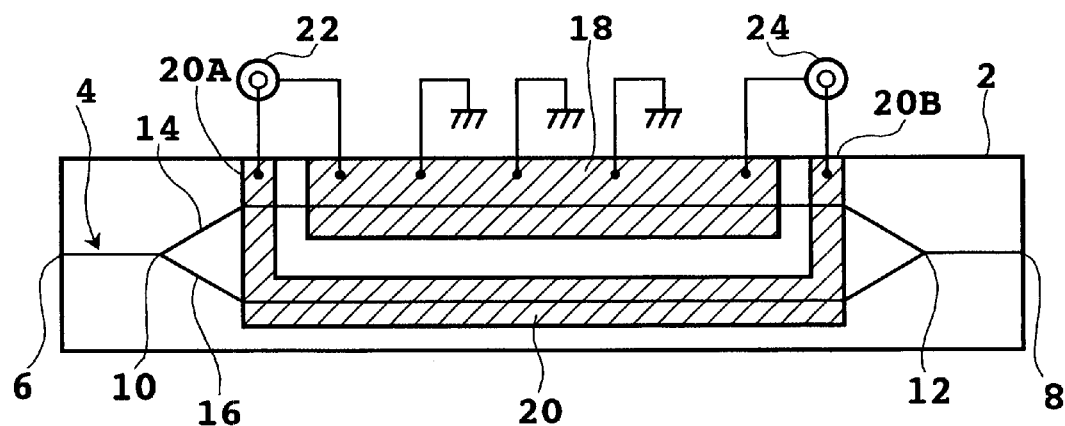
FIG. 1 is a plan view of a conventional modulator chip.
Figure 2:
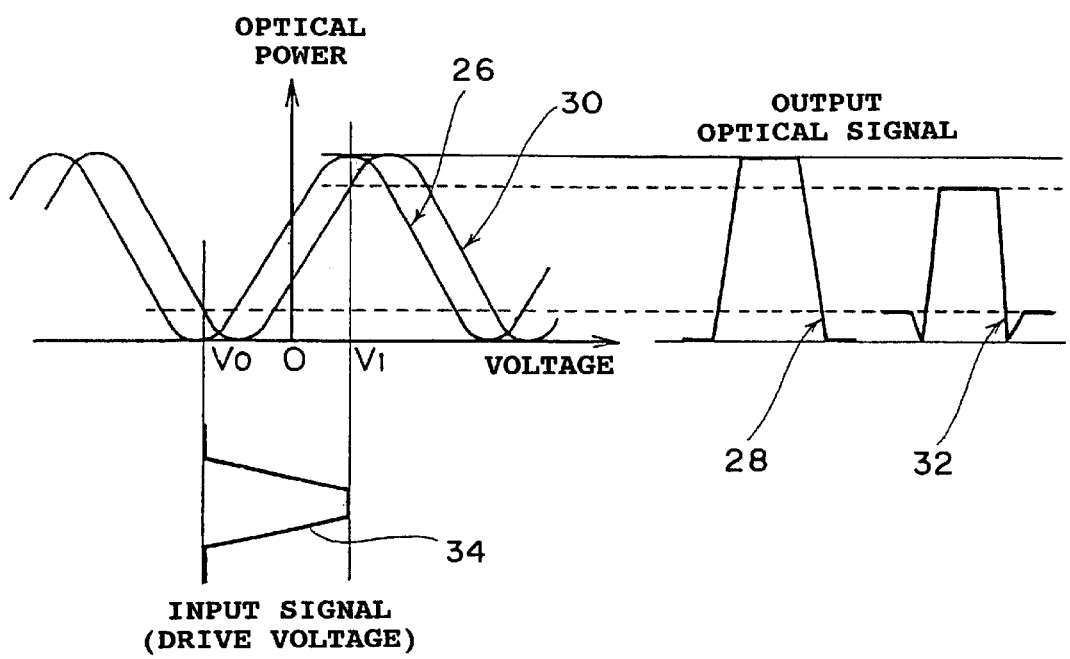
FIG. 2 is a graph for illustrating operation point drift in the modulator chip shown in FIG. 1.
Figure 3:
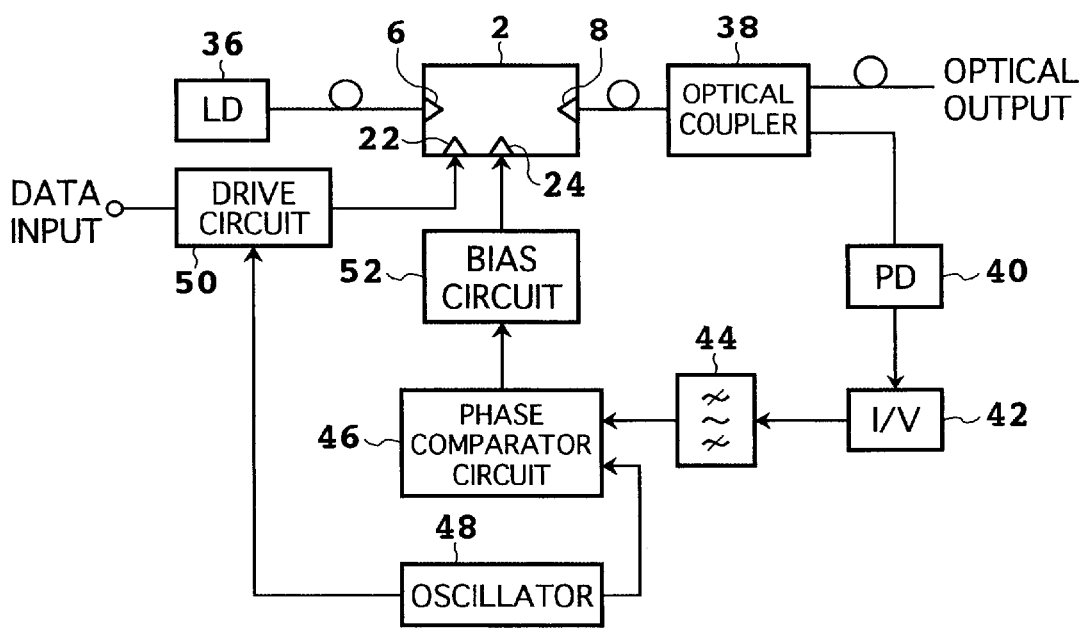
FIG. 3 is a block diagram of a conventional optical transmitter (optical modulator) to which operation point stabilization is applied.
Figure 4:
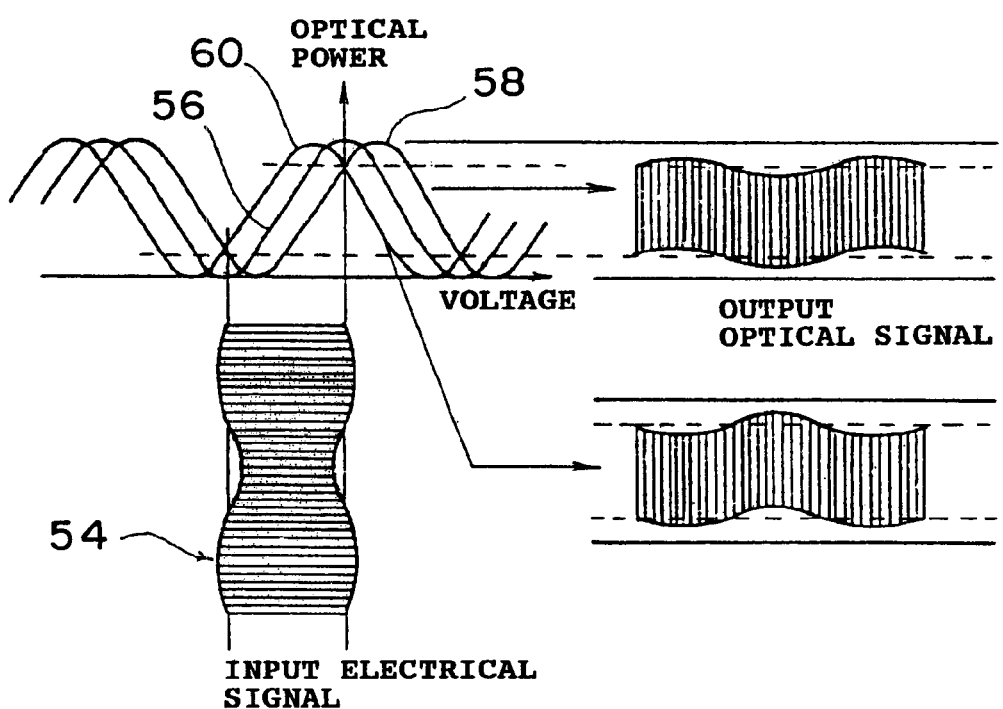
FIG. 4 is a graph for illustrating the principle of the operation point stabilization in the optical transmitter (optical modulator) shown in FIG. 3.

Some preferred embodiments of the present invention will now be described in detail with reference to the attached drawings. Throughout the drawings substantially the same parts are denoted by the same reference numerals.

Figure 5:
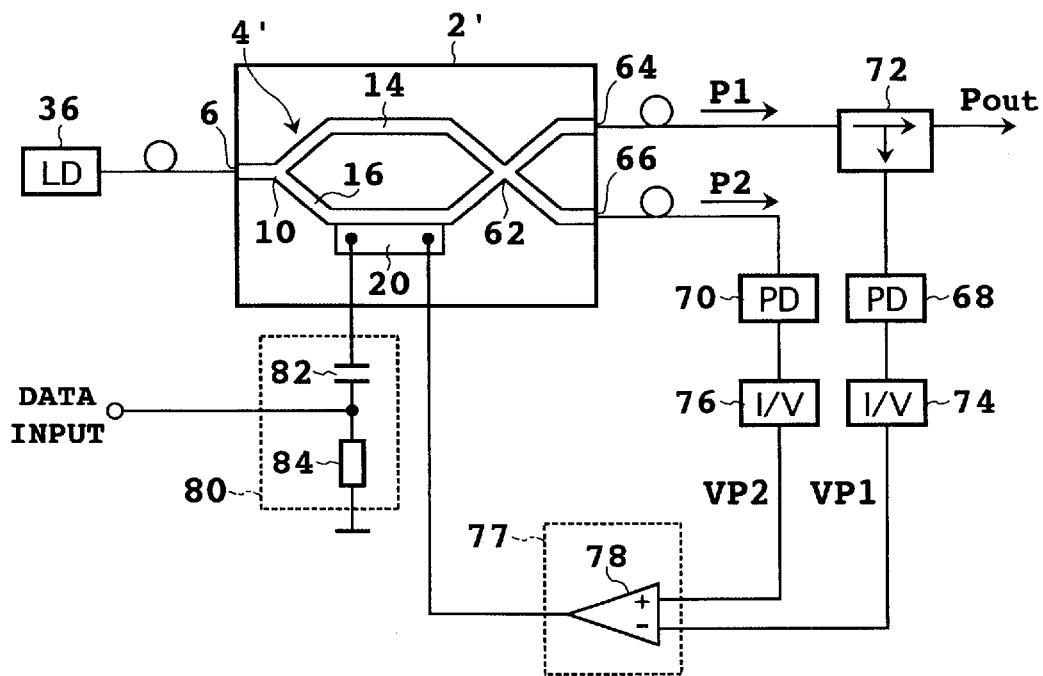
FIG. 5 is a block diagram showing a first preferred embodiment of the optical transmitter (optical modulator) according to the present invention.

FIG. 5 is a block diagram showing a first preferred embodiment of the optical transmitter (optical modulator) according to the present invention. This preferred embodiment employs a modulator chip 2' having an optical waveguide structure 4' slightly different from the optical waveguide structure 4 of the modulator chip 2 shown in FIG. 1, and performs bias control not requiring superimposition of a low-frequency signal.

The optical waveguide structure 4' includes an input port 6 for receiving an input beam from a laser diode 36, a first output port 64 for outputting a first output beam P1 as a modulated output, a second output port 66 for outputting a second output beam P2 as another modulated output, a Y branch 10 optically connected to the input port 6, an X branch 62 optically connected to the first and second output ports 64 and 66, and first and second paths 14 and 16 for optically connecting the Y branch 10 and the X branch 62.

A signal electrode 20 is provided along the second path 16. The signal electrode 20 applies an electric field to the optical waveguide structure 4', so as to switch between a first mode where the input beam is converted into the first output beam P1 and a second mode where the input beam is converted into the second output beam P2. A grounding electrode (corresponding to the grounding electrode 18 shown in FIG. 1) cooperating with the signal electrode 20 is not shown for simplicity of illustration.

First and second photodetectors 68 and 70 are used to detect the first and second output beams P1 and P2, respectively. The first photodetector 68 receives a monitor beam branched off from the first output beam P1 by an optical coupler 72, and the second photodetector 70 directly receives the second output beam P2. Each of the photodetectors 68 and 70 is provided by a photodiode. An output signal from each photodiode in this case is given by a current signal. Accordingly, to adapt the current signal to a bias voltage to be hereinafter described, the output signals from the photodetectors 68 and 70 are converted into voltage signals VP1 and VP2 by current/voltage converters 74 and 76, respectively.

The voltage signals VP1 and VP2 are supplied to a negative input port and a positive input port of a comparator 78 as a bias circuit 77, respectively. The bias circuit 77 applies a bias voltage to the signal electrode 20 so that the ratio in output level between the photodetectors 68 and 70 becomes constant. Particularly in this preferred embodiment, an output voltage from the comparator 78 is fed back as the bias voltage to the signal electrode 20 so that the levels of the voltage signals VP1 and VP2 becomes equal to each other.

A drive circuit 80 is connected to the signal electrode 20, so as to switch between the first and second modes for modulation. The drive circuit 80 includes a capacitor 82 and a resistor 84 connected in series, and a data input signal is supplied to a connection point between the capacitor 82 and the resistor 84, thereby supplying a modulating signal for switching between the first and second modes to the signal electrode 20.

Figure 6:
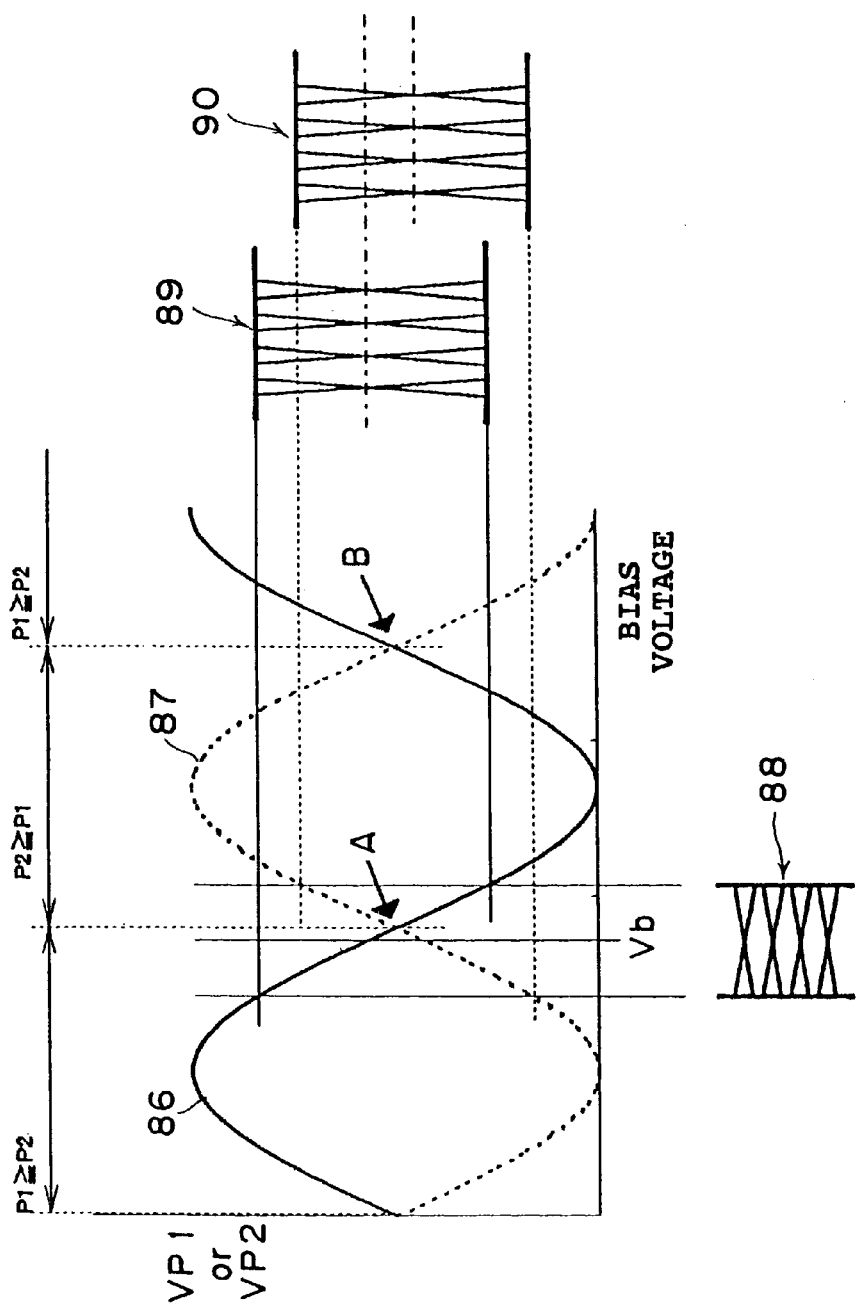
FIG. 6 is a graph showing an example of the operation characteristic in the present invention.

FIG. 6 is a graph showing an example of the operation characteristic in the present invention. Reference numeral 86 denotes a characteristic curve representing the relation between the voltage signal VP1 and the bias voltage (potential at the signal electrode 20), and reference numeral 87 denotes a characteristic curve representing the relation between the voltage signal VP2 and the bias voltage (potential at the signal electrode 20). In this example, the characteristic curves 86 and 87 are opposite in phase and equal in maximum value. That is, an optical coupling efficiency or the like in each of the photodetectors 68 and 70 is preliminarily adjusted so that the relation in magnitude between the voltage signals VP1 and VP2 corresponds to the relation in magnitude between the powers of the output beams P1 and P2. Specifically, an optical coupling efficiency or the like in the photodetector 68 is preliminarily increased by an amount corresponding to losses in the optical coupler 72 (see FIG. 5).

It is now assumed that a modulating signal as shown by reference numeral 88 is applied and that the average level thereof is equal to Vb falling in a region of P2<P1, the waveform of the first output beam P1 corresponds to a waveform as shown by reference numeral 89, and the waveform of the second output beam P2 corresponds to a waveform as shown by reference numeral 90. Accordingly, these waveforms 89 and 90 are out of balance, and an optimum operation point is not obtained. In this example, the amplitude of the modulating signal 88 is assumed to be neglected, and optimization of the amplitude will be hereinafter described.

In this preferred embodiment, an optimum bias voltage is given by an intersection between the characteristic curves 86 and 87. Accordingly, optimization of the operation point can be effected by controlling the bias voltage so that VP1=VP2.

In this preferred embodiment, in the case that VP2<VP1, i.e., in the case that P2<P1, the output voltage from the comparator 78 is negative, whereas in the case that VP1<VP2, i.e., in the case that P1<P2, the output voltage from the comparator 78 is positive. Therefore, the bias voltage becomes stable at a convergent point B shown in FIG. 6 as the result of bias voltage control. Accordingly, by setting the amplitude of the modulating signal 88 so that the two levels of the modulating signal 88 becomes equal to potentials giving a minimum value and a maximum value of the characteristic curve 86 or 87, an output optical signal with no waveform distortion and a high extinction ratio can be obtained. Furthermore, since superimposition of a low-frequency signal is not carried out in this preferred embodiment, intersymbol interference can be suppressed.

In this preferred embodiment, the optical waveguide structure 4' is provided by a Mach-Zehnder type (distributed interference type) interferometer, and the optical waveguide structure 4' is formed on a lithium niobate substrate. Accordingly, an electric field can be effectively applied between the first and second paths 14 and 16 by a planar electrode, thereby obtaining a high phase-modulation efficiency. Furthermore, the electrode for switching between the first and second modes is provided along at least one of the first and second paths 14 and 16, effective application of an electric field to each path can be effected.

As best shown in FIG. 5, the modulating signal from the drive circuit 80 is supplied to an end portion of the signal electrode 20 nearer to the Y branch 10, and the bias voltage from the bias circuit 77 is supplied to another end portion of the signal electrode 20 nearer to the X branch 62. In general, the signal electrode 20 is terminated at an end portion thereof where the bias voltage is supplied, so that the signal electrode 20 is of a traveling wave type, thereby allowing high-speed modulation.

Figure 7:
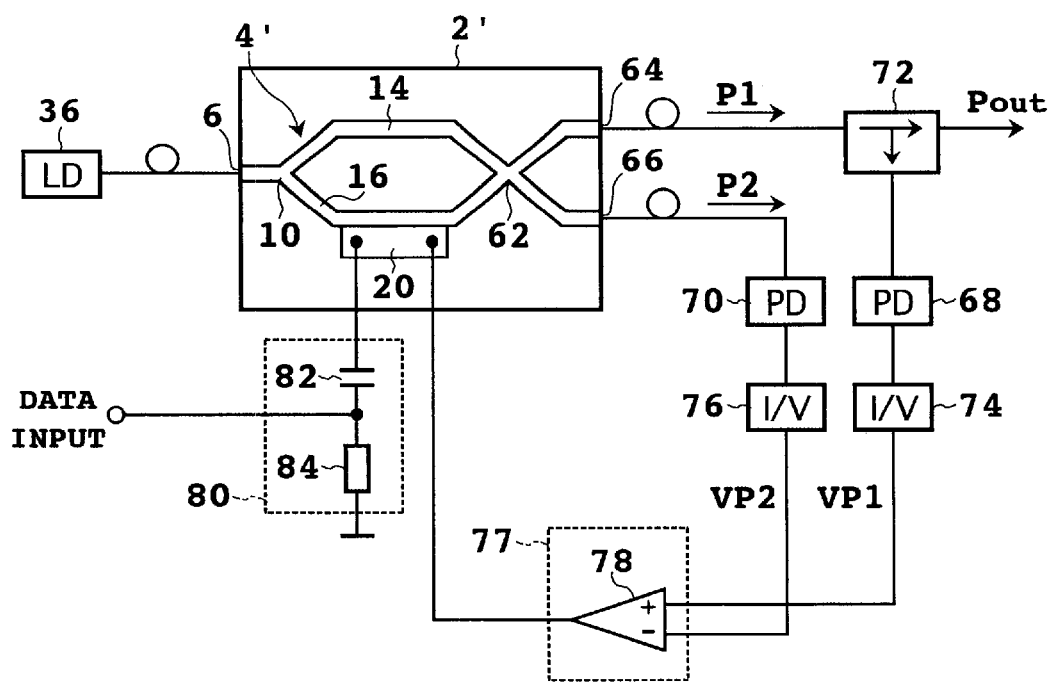
FIG. 7 is a block diagram showing a second preferred embodiment of the optical transmitter (optical modulator) according to the present invention.

FIG. 7 is a block diagram showing a second preferred embodiment of the optical transmitter (optical modulator) according to the present invention. In this preferred embodiment, current/voltage converters 74 and 76 are connected to a comparator 78 in a manner opposite to that in the first preferred embodiment shown in FIG. 5. That is, the current/voltage converter 74 related to the first output beam P1 is connected to the positive input port of the comparator 78, and the current/voltage converter 76 related to the second output beam P2 is connected to the negative input port of the comparator 78.

Accordingly, in the case that VP2<VP1, i.e., in the case that P2<P1, the output voltage from the comparator 78 is positive, whereas in the case that VP1<VP2, i.e., in the case that P1<P2, the output voltage from the comparator 78 is negative. Accordingly, in the second preferred embodiment shown in FIG. 7, the bias voltage becomes stable at a convergent point A shown in FIG. 6.

In the first preferred embodiment shown in FIG. 5, the bias voltage becomes stable at the convergent point B as mentioned above, so that the modulating signal and the output optical signal correspond to each other in a region where the slope of the characteristic curve 86 is positive. Accordingly, the first and second modes correspond to the high level and low level of the modulating signal, respectively. In contrast, in the second preferred embodiment shown in FIG. 7, the bias voltage becomes stable at the convergent point A as mentioned above, so that the modulating signal and the output optical signal correspond to each other in a region where the slope of the characteristic curve 86 is negative. Accordingly, the first and second modes correspond to the low level and high level of the modulating signal, respectively.

The first and second preferred embodiments differ resultantly from each other in polarity of the data input signal (the modulating signal) and in chirp parameter of the output optical signal, the latter being important. This will now be described more specifically.

In an optical switching device utilizing interference such as a Mach-Zehnder type optical modulator, prechirping can be performed by utilizing a wavelength change (chirping) substantially generated by interference. The prechirping is a method for suppressing degradation of a transmission waveform due to chromatic dispersion and nonlinear effects, by preliminarily providing a wavelength (frequency) change in one pulse of an optical signal to be transmitted.

Figure 8A:
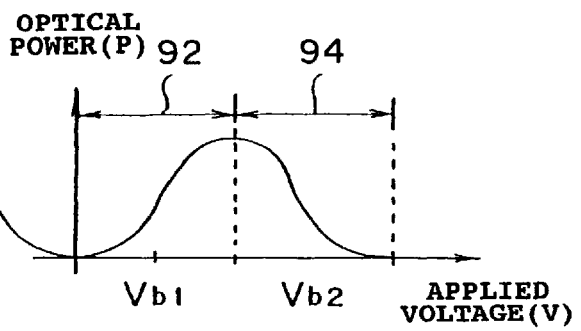
FIGS. 8A to 8D are graphs for illustrating switching of a chirp parameter.

Referring to FIG. 8A, there is shown an operating characteristic curve of a Mach-Zehnder type optical modulator (which curve substantially corresponds to the characteristic curve 86 shown in FIG. 6). When a region 92 in the vicinity of one stable point Vb1 is used as an applied voltage to apply a positive voltage pulse as shown by a left-hand graph in FIG. 8B, a positive optical pulse having the same polarity as that of the voltage pulse is output as shown by a left-hand graph in FIG. 8C, because optical power (P) increases with an increase in applied voltage (V) in the region 92. At this time, the wavelength becomes shorter than an average value at a rising part of the optical pulse, and becomes longer than the average value at a falling part of the optical pulse as shown by a left-hand graph in FIG. 8D. That is, in one optical pulse the wavelength is shifted from a shorter-wavelength side (blue side) to a longer-wavelength side (red side) as time (t) proceeds. This phenomenon is called red shift.

Figure 8B:
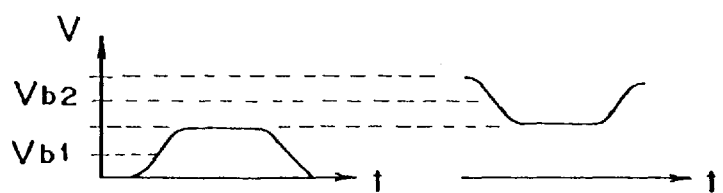
Figure 8C:
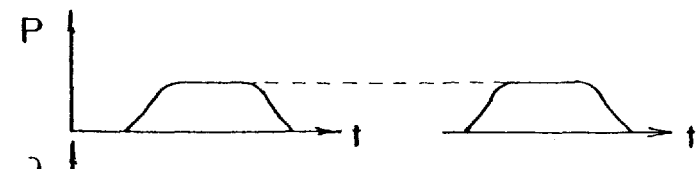
Figure 8D:
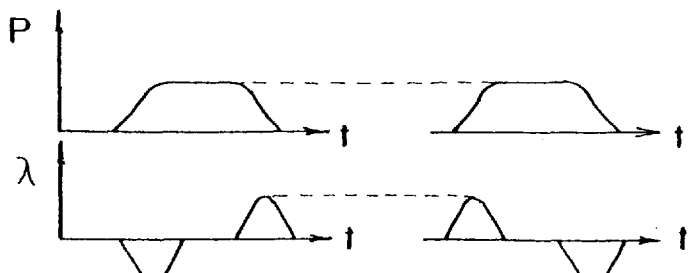

In contrast, when a region 94 in the vicinity of another stable point Vb2 is used to apply a negative voltage pulse as shown by a right-hand graph in FIG. 8B, a positive optical pulse having a polarity opposite to that of the voltage pulse is output as shown in a right-hand graph in FIG. 8C, because optical power (P) decreases with an increase in applied voltage (V) in the region 94. At this time, the wavelength is shifted to a longer-wavelength side at a rising part of the optical pulse, and is shifted to a shorter-wavelength side at a falling part of the optical pulse as shown by a right-hand graph in FIG. 8D. That is, in one optical pulse, the wavelength is shifted from a longer-wavelength side (red side) to a shorter-wavelength side (blue side) as time (t) proceeds. This phenomenon is called blue shift.

A chirp parameter α of an optical pulse is given by:

$$\alpha = 2(d\phi/dt)/(dS/dt)/S$$

where $\phi$ is the optical phase, and S is the optical intensity. In the case of red shift, the chirp parameter α takes a positive value, whereas in the case of blue shift, the chirp parameter α takes a negative value.

When the wavelength of an optical signal is shorter than the zero-dispersion wavelength of an optical fiber used as a transmission line, and falls in a region of normal dispersion, light of a longer wavelength travels faster than light of a shorter wavelength in the optical fiber. Accordingly, by preliminarily providing prechirping of 0<α (red shift), pulse compression occurs to increase an eye opening. Conversely, when the wavelength falls in a region of anomalous dispersion, light of a shorter wavelength travels faster than light of a longer wavelength in the optical fiber. Accordingly, by preliminarily providing prechirping of a α<0 (blue shift), the eye opening can be increased.

Further, by adjusting the value of the chirp parameter α in response to the conditions of the optical fiber transmission line, the transmission conditions of the whole system can be optimized.

Figure 9:
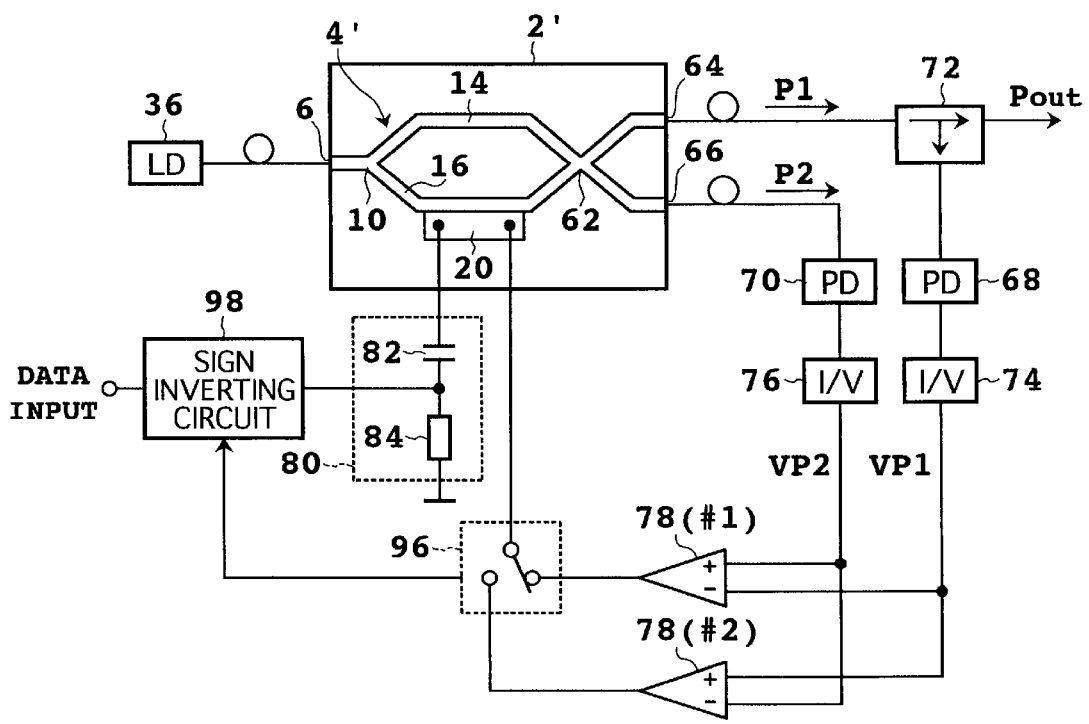
FIG. 9 is a block diagram showing a third preferred embodiment of the optical transmitter (optical modulator) according to the present invention.

FIG. 9 is a block diagram showing a third preferred embodiment of the optical transmitter (optical modulator) according to the present invention. In this preferred embodiment, one of the convergent points A and B shown in FIG. 6 can be selectively obtained to set a desired chirp parameter.

The voltage signal VP1 related to the output beam P1 and the voltage signal VP2 related to the output beam P2 are supplied to the negative input port and positive input port of a comparator 78(#1), respectively, or the voltage signals VP1 and VP2 are supplied to the positive input port and negative input port of a comparator 78(#2), respectively. One of the comparators 78(#1) and 78(#2) is selected by a switch 96 to supply a bias voltage to the signal electrode 20. When the comparator 78(#1) is selected, the bias voltage becomes stable at the convergent point B in accordance with the first preferred embodiment shown in FIG. 5, so that red shift is given to the output optical signal to obtain a positive value of the chirp parameter α. On the other hand, when the comparator 78(#2) is selected, the bias voltage becomes stable at the convergent point A in accordance with the second preferred embodiment shown in FIG. 7, so that blue shift is given to the output optical signal to obtain a negative value of the chirp parameter α.

In this preferred embodiment, a sign inverting circuit 98 operating in response to the operation of the switch 96 is provided. As mentioned above with reference to FIG. 8B, the polarity of a modulating signal required is inverted by switching of the sign of the chirp parameter. To cope with this, the sign inverting circuit 98 is used to invert the polarity of a data input signal supplied to the drive circuit 80, in response to the operation of the switch 96.

According to the third preferred embodiment shown in FIG. 9, the switch 96 operates to switch between a first condition where the first and second modes respectively correspond to the low level and high level of the modulating signal and a second condition where the first and second modes respectively correspond to the high level and low level of the modulating signal. Accordingly, either a positive chirp parameter or a negative chirp parameter can be selected for an optical signal to be obtained, and by adapting the selected chirp parameter to an optical fiber transmission line, a waveform degradation of transmitted light can be reduced.

Particularly, by adopting the sign inverting circuit 98 as shown in FIG. 9, the polarity of a data input signal can be fixed irrespective of the sign (positive or negative) of the chirp parameter, thereby simplifying the circuit for driving the optical modulator.

In each preferred embodiment mentioned above, it is preferable that the detection sensitivity (or conversion efficiency) of at least one of the photodetectors 68 and 70 is adjustable. With this configuration, the degree of freedom of the amplitude of the modulating signal (input electrical signal) can be increased. This will now be described more specifically.

Figure 10:
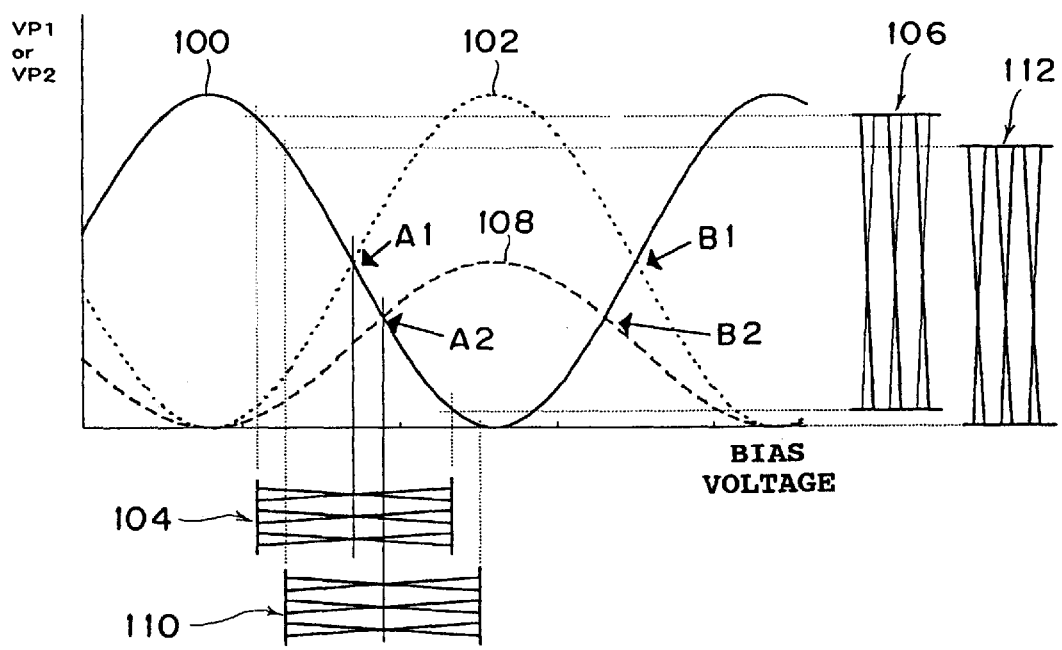
FIG. 10 is a graph showing another example of the operation characteristic in the present invention.

FIG. 10 is a graph showing another example of the operation characteristic in the present invention. Reference numerals 100 and 102 denote characteristic curves respectively corresponding to the characteristic curves 86 and 87 shown in FIG. 6. In this case, the characteristic curves 100 and 102 have the same maximum value, so that the bias voltage becomes stable at a convergent point A1 or B1. In other words, the middle point of voltages corresponding to a maximum value and a minimum value in each of the characteristic curves 100 and 102 becomes a stable point. Accordingly, by using a modulating signal as shown by reference numeral 104 such that its average level is equal to a voltage corresponding to the convergent point A1, an output optical signal as shown by reference numeral 106 is obtained. In this case, as described above, the amplitude of the modulating signal must be made equal to Vπ, so as to increase the extinction ratio of the output optical signal.

Reference numeral 108 denotes a characteristic curve obtained by adjusting the detection sensitivity of the second photodetector 70 so as to reduce the maximum value to ½ of the maximum value in the characteristic curve 100. In the combination of the characteristic curves 100 and 108, the bias voltage becomes stable at a convergent point B2 in the first preferred embodiment shown in FIG. 5, whereas the bias voltage becomes stable at a convergent point A2 in the second preferred embodiment shown in FIG. 7. That is, the convergent point approaches the bottom in the characteristic curve 100.

Accordingly, in the second preferred embodiment shown in FIG. 7, for example, by applying a modulating signal as shown by reference numeral 110, an output optical signal as shown by reference numeral 112 can be obtained. In this case, an optimum amplitude of the modulating signal for maximizing the extinction ratio of the output optical signal becomes smaller than Vπ, so that it is possible to provide an optical modulator or optical transmitter suitable for high-speed operation.

Alternatively, the detection sensitivity of the first photodetector 68 may be adjusted to obtain a characteristic curve of the voltage signal VP1 such that its maximum value is smaller than the maximum value in the characteristic curve 100. In this case, by applying the bias control according to the present invention to the combination of the characteristic curve obtained above and the characteristic curve 102, the convergent point can be made approach the bottom in the characteristic curve 102.

Thus, according to the embodiment of the present invention, the detection sensitivity of at least one of the first and second photodetectors is adjustable, thereby obtaining a good extinction ratio irrespective of the amplitude of the input electrical signal.

In the description that the first and second photodetectors detect the powers of the first and second output beams, respectively, each power may be understood as an average power in carrying out the present invention. Accordingly, a photodetector having a low response speed to such an extent that it cannot follow a main signal may be used as each photodetector.

Further, the adjustment of the detection sensitivity of each photodetector may be effected by adjusting an optical coupling efficiency in a light receiving portion of each photodetector. Further, in each preferred embodiment, the detection sensitivity of each photodetector may be adjusted according to an optical coupling efficiency in the output port 64 or 66 of the modulator chip 2' or a distribution ratio in the X branch 62 of the modulator chip 2'. In the case that each photodetector is provided by an Avalanche photodiode, the detection sensitivity may be adjusted by adjusting a bias voltage to the Avalanche photodiode.

While the modulator chip 2' having the X branch 62 is used in each preferred embodiment mentioned above, the present invention is not limited to the above preferred embodiments. For example, the conventional modulator chip 2 having the two Y branches 10 and 12 shown in FIG. 1 may be used to carry out the present invention. This will now be described more specifically.

Figure 11:
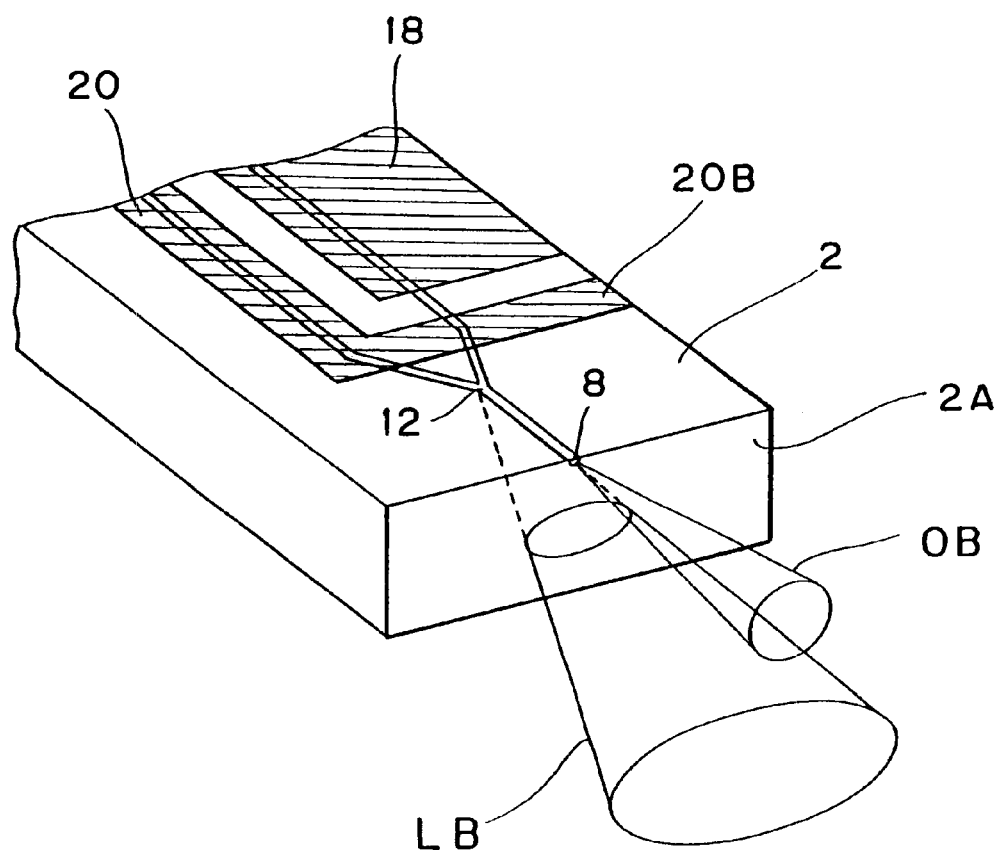
FIG. 11 is a perspective view for illustrating a leaky beam.

FIG. 11 is a cutaway perspective view of the modulator chip 2 shown in FIG. 1, for illustrating a leaky beam in the modulator chip 2. The chip 2 has an end surface 2A substantially flush with the output port 8.

Reference symbol LB denotes a leaky beam radiated from the Y branch 12 into the chip 2 and further radiated from the end surface 2A into the air. Reference symbol OB denotes an output beam generated as the result of interference at the Y branch 12. The output beam OB is radiated from the output port 8 into the air. Accordingly, by making the output beam OB and the leaky beam LB respectively correspond to the first output beam P1 and the second output beam P2 in each preferred embodiment, bias control for the modulator chip 2 can be performed without using a low-frequency signal.

According to the present invention as described above, it is possible to provide an optical modulator which can suppress intersymbol interference, a bias control circuit for the optical modulator, and an optical transmitter including the optical modulator. Further, according to a specific preferred embodiment of the present invention, it is possible to provide an optical modulator which can obtain a good extinction ratio irrespective of the amplitude of an input electrical signal, a bias control circuit for the optical modulator, and an optical transmitter including the optical modulator.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical modulator comprising:
    an optical waveguide structure for converting an input beam into first and second output beams;
    an electrode for applying an electric field to said optical waveguide structure, so as to switch between a first mode where said input beam is converted into said first output beam and a second mode where said input beam is converted into said second output beam;
    first and second photodetectors for detecting the powers of said first and second output beams, respectively; and
    a bias circuit for applying a bias to said electrode so that the ratio in output level between said first and second photodetectors becomes constant.

2. An optical modulator according to claim 1, wherein said optical waveguide structure is provided by a Mach-Zehnder type interferometer.

3. An optical modulator according to claim 1, wherein said optical waveguide structure is formed on a lithium niobate substrate.

4. An optical modulator according to claim 1, wherein said optical waveguide structure comprises:
    an input port for receiving said input beam; first and second output ports for outputting said first and second output beams, respectively;
    a Y branch optically connected to said input port;
    an X branch optically connected to said first and second output ports; and
    first and second paths for optically connecting said Y branch and said X branch.

5. An optical modulator according to claim 4, wherein said electrode is provided along at least one of said first and second paths.

6. An optical modulator according to claim 5, wherein a modulating signal for switching between said first and second modes is supplied to an end portion of said electrode nearer to said Y branch, and said bias is supplied to another end portion of said electrode nearer to said X branch.

7. An optical modulator according to claim 1, wherein said optical waveguide structure comprises:
    an input port for receiving said input beam;
    an output port for outputting said first output beam;
    a first Y branch optically connected to said input port;
    a second Y branch optically connected to said output port; and
    first and second paths for optically connecting said first and second Y branches;
    said second output beam being provided by a leaky beam radiated from said second Y branch.

8. An optical modulator according to claim 7, wherein said optical waveguide structure is provided by a waveguide substrate, and said leaky beam is further radiated from an end surface of said waveguide substrate.

9. An optical modulator according to claim 7, wherein said electrode is provided along at least one of said first and second paths.

10. An optical modulator according to claim 9, wherein a modulating signal for switching between said first and second modes is supplied to an end portion of said electrode nearer to said first Y branch, and said bias is supplied to another end portion of said electrode nearer to said second Y branch.

11. An optical modulator according to claim 1, further comprising a drive circuit for supplying a modulating signal for switching between said first and second modes to said electrode.

12. An optical modulator according to claim 11, wherein said first and second modes correspond to the low level and high level of said modulating signal, respectively.

13. An optical modulator according to claim 11, wherein said first and second modes correspond to the high level and low level of said modulating signal, respectively.

14. An optical modulator according to claim 11, further comprising a switch for switching between a first condition where said first and second modes respectively correspond to the low level and high level of said modulating signal and a second condition where said first and second modes respectively correspond to the high level and low level of said modulating signal.

15. An optical modulator according to claim 14, further comprising an inverting circuit for inverting the polarity of said modulating signal in response to the operation of said switch.

16. An optical modulator according to claim 1, wherein the detection sensitivity of at least one of said first and second photodetectors is adjustable.

* * * * *